UNITED STATES PATENT OFFICE.

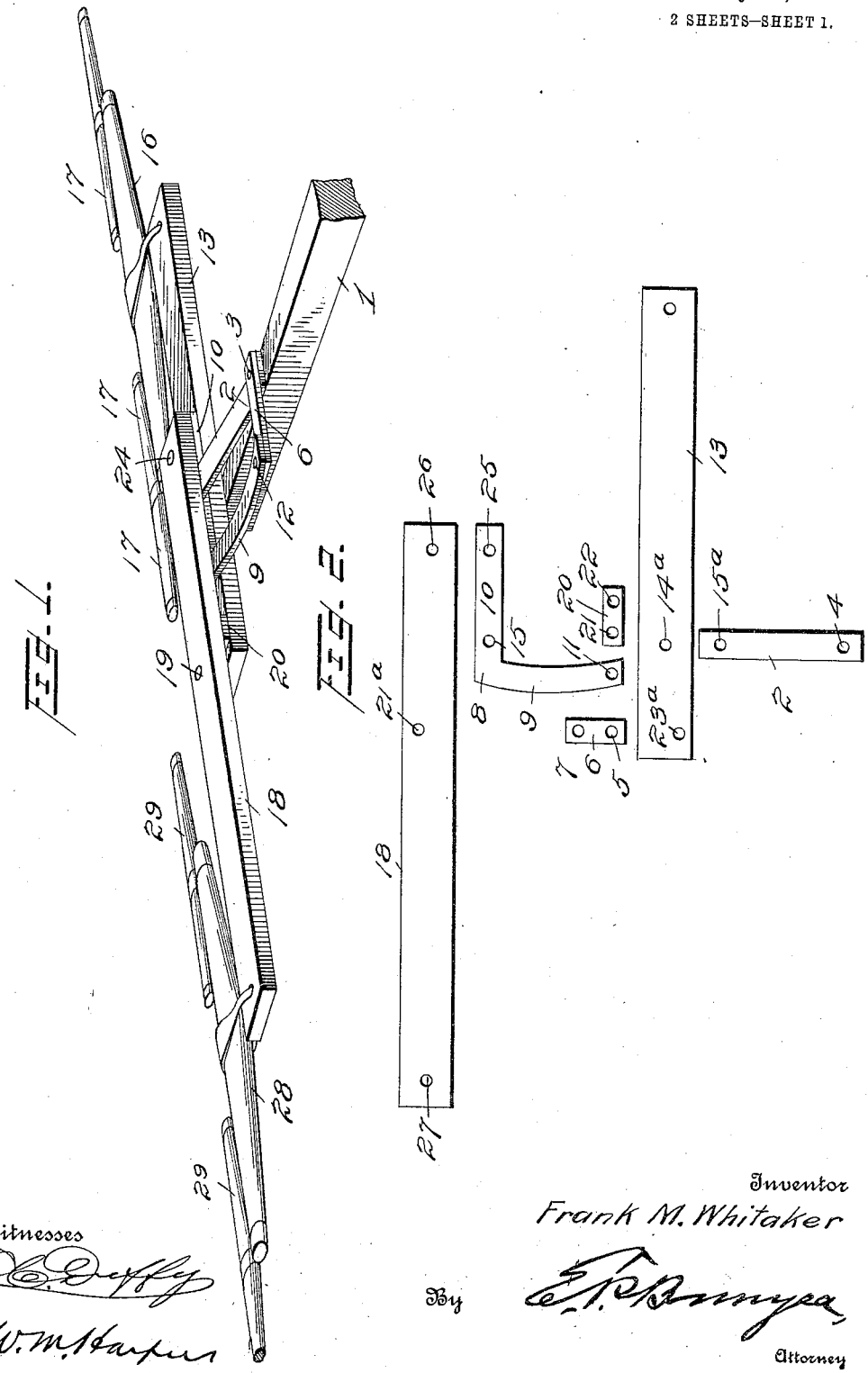

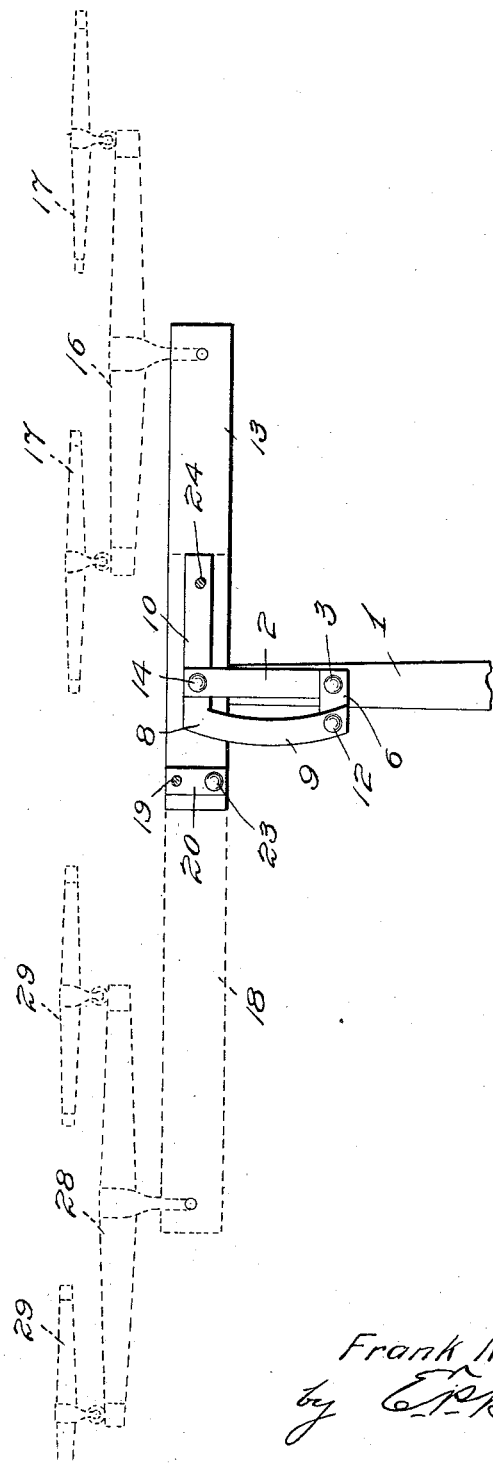

FRANK M. WHITAKER, OF VIVIAN, SOUTH DAKOTA.

DRAFT APPLIANCE.

1,067,701.  Specification of Letters Patent.  Patented July 15, 1913.

Application filed November 1, 1911. Serial No. 657,991.

*To all whom it may concern:*

Be it known that I, FRANK M. WHITAKER, a citizen of the United States of America, residing at Vivian, in the county of Lyman and State of South Dakota, have invented certain new and useful Improvements in Draft Appliances, of which the following is a specification.

This invention relates to draft appliances designed for the purpose of preventing the crowding of the draft animals when connected to a gang plow or other agricultural implement in which there are a number of animals working side by side.

Another object is to provide a draft appliance of comparatively simple construction which will be durable and efficient for its purpose, and which can be manufactured at low cost.

These and other objects may be obtained by means of the construction illustrated in the accompanying drawings.

Figure 1 is a perspective view of a four horse evener made in accordance with my invention and attached to the beam of a plow, the latter being shown broken away; Fig. 2 is a plan view of the various parts of the evener disconnected; and Fig. 3 is a top plan view of the lower or short draft bar, the long draft bar being shown in dotted lines and the doubletrees and swingletrees being also shown in dotted lines.

Referring to the drawings, the numeral 1 designates the beam of a plow or other implement. A metal plate 2 is pivoted near the front of the beam on the bolt 3, said bolt extending through a hole 4 in the plate 2 and through a hole 5 in the plate 6. The plate 6 is provided with a hole 7 at the end opposite the hole 5. A lever 8 preferably formed of steel is provided with a curved arm 9 and an angular arm 10. This lever is provided with a hole 11 at the end of the curved member and passing through said hole 11 and through the hole 7 in the plate 6 is a pivot bolt 12. A short draft bar 13 is pivoted upon a bolt 14 which extends through a hole 14ᵃ in said bar 13, through a hole 15 in the arm 10 of the lever 8, and thence through a hole 15ᵃ in the bar 2. Connected to the outer end of the draft bar 13 is a doubletree 16 carrying two swingletrees 17.

The long draft bar 18 is pivoted at 19 to a spacing plate 20 through the hole 21 therein and through the hole 21ᵃ in said draft bar, said spacing plate being pivoted to the draft bar 13 through the hole 22 on the bolt 23, said bolt passing through the hole 23ᵃ in the draft bar 13.

The arm 10 of the lever is pivoted on a bolt 24 extending through a hole 25 in the lever 10 and extending through a hole 26 in the long draft bar 18. The long draft bar 18 has connected to its outer end through the hole 27 a doubletree 28 carrying two swingletrees 29.

The operation of my invention may be briefly described as follows: The line of draft is through the bolt 14, and the animals attached to the swingletree 29 pull upon the bolt 19, each animal having sufficient room to prevent crowding.

My invention is comparatively simple in construction and will operate smoothly and efficiently for its purpose.

I claim:

The herein described draft appliance comprising a plate having one end pivoted to the beam of a plow or other implement, a short plate pivoted at one end to the first mentioned plate at its pivotal point with said beam, a lever provided with a curved arm and an angular arm, the end of said curved arm being pivoted to the outer end of said short plate, the angular arm being pivoted near the curved arm to the opposite end of the first named plate, a short draft bar pivoted near its inner end to the angular arm at its pivotal point with the first mentioned plate, a long draft bar having its inner end pivoted to the outer end of the said angular arm, said long draft bar being placed above the said first mentioned draft bar, a spacing plate interposed between the inner end of the short draft bar and the under side of the long draft bar, the inner end of said short draft bar being pivoted to the spacing plate at the rear end thereof, the long draft bar being pivoted to the spacing plate at the forward end thereof, and a doubletree connected to the outer end of each of the draft bars.

In testimony whereof I affix my signature in presence of two witnesses.

FRANK M. WHITAKER.

Witnesses:
WM. L. HITCHCOCK,
W. C. HITCHCOCK.